UNITED STATES PATENT OFFICE.

HANS KUŽEL, OF BADEN, NEAR VIENNA, AUSTRIA-HUNGARY.

FILAMENT FOR ELECTRIC INCANDESCENT LAMPS AND PROCESS OF MAKING THE SAME.

No. 896,060.	Specification of Letters Patent.	Patented Aug. 11, 1908.

Application filed May 7, 1907. Serial No. 372,354.

*To all whom it may concern:*

Be it known that I, HANS KUŽEL, a subject of the Emperor of Germany, and a resident of Baden, near Vienna, Empire of Austria-Hungary, have invented certain new and useful Improvements in Filaments for Electric Incandescent Lamps and Processes of Making the Same, of which the following is a full, clear, and exact specification.

According to H. Schulze (*Journal für Praktische Chemie*, XXXII, page 399) colloidal tungsten is obtained by reducing tungstic trioxid with potassium cyanid. But from a paper of Dèsi (*Journal of the American Chemical Society*, 1897, page 239 and the following) it is seen that the reaction goes on differently according to the temperature maintained. On the one hand at the most intense white heat the reaction leads to crystalline or molten tungsten, while on the other hand when working at as low a red heat as possible, an oxynitrid in the form of black powder is obtained, the exact composition of which could not be found. By heating tungstic trioxid with sal ammonia, Dèsi obtained the same oxynitrids (l. c. page 236 and the following) which likewise could not be defined exactly. According to the temperature at which the reaction was carried out the black bodies obtained showed, when analyzed, a varying percentage of tungsten, down to 83 per cent. and even less.

The varying results of the analysis might possibly be explained by assuming that when working at low temperatures besides an oxynitrid of a well defined composition, there is produced simultaneously therewith always a larger or smaller amount of colloidal tungsten. I have found that these black substances containing oxynitrids of tungsten are partly already in the colloidal state, and that they may be readily converted completely into the colloidal state by the method of my patent, 871,599, Nov. 19, 1907, which consists in treating the most finely comminuted substance alternately with solutions of an acid and a non-acid character under thorough agitation and also heating to a temperature not exceeding 100° centigrade.

The object of my present invention is to utilize these black more or less colloidal products containing oxynitrids for manufacturing filaments.

The substance obtained as above described in a more or less completely colloidal state is worked into a plastic mass in the known manner either by removing therefrom any superfluous imbibition liquid by cautious evaporation or by pressure or by incorporating into the substance the required quantity of imbibition liquid by thorough mixing and agitation or kneading From the plastic mass thus obtained threads are made in any known manner, preferably by squirting these threads containing tungsten and colloidal oxynitrids of tungsten. They are then cautiously dried and finally gradually heated to a white heat, preferably by an electric current passed through them. The heating is effected in a non-oxidizing atmosphere either in an inert or reducing gas, such as hydrogen or nitrogen, and preferably in the form of a current, or it may be *in vacuo*, the vacuum being maintained uniform during the heating as nearly as possible by means of an efficient pump. By such heating, the colloidal tungsten is converted into the crystalline state and at the same time the oxynitrids of tungsten are reduced to tungsten, also in the crystalline state, so that a filament consisting of pure tungsten in the crystalline state is obtained which is ready for use. This conversion is accompanied by a reduction of the diameter and the length of the filament, this reduction being nearly twice the shrinking of pure colloidal tungsten. By using the black colloids containing oxynitrids of tungsten it is therefore possible to obtain most easily much thinner filaments than by using pure colloidal tungsten.

The great shrinkage is fairly well explained by the fact that the colloid containing oxynitrids contains only 83 per cent. tungsten and that these colloidal threads, as has been shown by experiment, are capable of retaining more imbibition liquid (possibly in the form of gel water which plays a part similar to that of crystal water) than the colloidal tungsten.

The importance of this new process is clearly shown by the fact that a necessary condition for the production of high voltage and low candle power lamps (110 volts and 16 candle power or 110 volts and 10 candle power) is to obtain most fine filaments the diameter of which is about 0.015 to 0.02 millimeters.

I claim as my invention:

1. A process of manufacturing particularly thin tungsten filaments for electric incandescent lamps, consisting in producing a plastic mass containing tungsten and colloidal oxynitrid of tungsten, forming threads therefrom, drying such threads and finally gradually heating such threads to a white heat in a non-oxidizing atmosphere, substantially as and for the purpose described.

2. As a new article of manufacture, a thread capable of being converted into a crystalline tungsten filament and containing tungsten and colloidal oxynitrid of tungsten, substantially as described.

In testimony whereof I have signed my name to this specification, in the presence of two subscribing witnesses.

HANS KUŽEL.

Witnesses:
ARTHUR BAUMANN,
ROBT. W. HEINGARTNER.